US012215642B2

(12) United States Patent
Rajamani et al.

(10) Patent No.: US 12,215,642 B2
(45) Date of Patent: Feb. 4, 2025

(54) COMPRESSION IGNITION ENGINE CONTROL

(71) Applicant: Regents of the University of Minnesota, Minneapolis, MN (US)

(72) Inventors: Rajesh Rajamani, Saint Paul, MN (US); Woongsun Jeon, Seoul (KR)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 18/465,387

(22) Filed: Sep. 12, 2023

(65) Prior Publication Data

US 2024/0093653 A1 Mar. 21, 2024

Related U.S. Application Data

(60) Provisional application No. 63/375,344, filed on Sep. 12, 2022.

(51) Int. Cl.
*F02D 35/02* (2006.01)
*F02D 41/06* (2006.01)

(52) U.S. Cl.
CPC ......... *F02D 35/023* (2013.01); *F02D 35/027* (2013.01); *F02D 41/062* (2013.01); *F05D 2270/334* (2013.01)

(58) Field of Classification Search
CPC .. F02D 41/1497; F02D 35/024; F02D 35/027; F02D 2200/025
See application file for complete search history.

(56) References Cited

U.S. PATENT DOCUMENTS

| | | | | |
|---|---|---|---|---|
| 4,819,603 | A * | 4/1989 | Morita | F02P 5/1522 123/406.21 |
| 6,388,444 | B1 * | 5/2002 | Hahn | G01M 15/11 123/406.24 |
| 8,265,853 | B2 | 9/2012 | Buslepp et al. | |
| 8,266,947 | B2 | 9/2012 | Yoeda | |
| 8,281,643 | B2 | 10/2012 | Yasuda | |
| 8,342,011 | B2 | 1/2013 | Galtier et al. | |
| 8,396,649 | B2 | 3/2013 | Huang | |
| 8,423,267 | B2 | 4/2013 | Iwatani | |
| 8,429,955 | B2 | 4/2013 | Taglialatela Scafati et al. | |

(Continued)

FOREIGN PATENT DOCUMENTS

| | | | |
|---|---|---|---|
| CN | 113868956 | A | 12/2021 |
| FR | 2862089 | B1 | 11/2007 |

(Continued)

OTHER PUBLICATIONS

Abbaszadehmosayebi et al., "Determination of Specific Heat Ratio and Error Analysis for Engine Heat Release Calculations," Applied Energy, vol. 122, Jun. 1, 2014, pp. 143-150.

(Continued)

*Primary Examiner* — John Kwon
(74) *Attorney, Agent, or Firm* — Shumaker & Sieffert, P.A.

(57) ABSTRACT

A method of estimating in-cylinder pressure includes receiving a vibration signal from a vibration sensor mounted proximate a compression ignition (CI) engine, receiving angular position information for the CI engine, and determining in-cylinder pressure based on the angular position information and on a combustion component of the vibration signal.

5 Claims, 6 Drawing Sheets

(56) References Cited

U.S. PATENT DOCUMENTS

| | | | | |
|---|---|---|---|---|
| 9,127,608 | B2 | 9/2015 | Ito et al. | |
| 9,212,615 | B2 | 12/2015 | Shimo et al. | |
| 9,423,390 | B2 | 8/2016 | Tsuchimaya et al. | |
| 9,494,489 | B2 | 11/2016 | Hagari | |
| 10,345,286 | B2 | 7/2019 | Cochet et al. | |
| 10,519,888 | B2 | 12/2019 | Huang et al. | |
| 10,683,822 | B2 | 6/2020 | Yamamoto | |
| 2010/0037858 | A1 | 2/2010 | Kang | |
| 2010/0313640 | A1* | 12/2010 | Galtier | F02D 41/1497 73/114.17 |
| 2016/0160776 | A1* | 6/2016 | Yeager | F02D 35/023 123/435 |
| 2016/0160779 | A1* | 6/2016 | Yeager | F02D 35/023 701/103 |
| 2018/0348401 | A1 | 12/2018 | Imhof | |
| 2019/0250520 | A1 | 8/2019 | Urbanczyk | |
| 2021/0079856 | A1 | 3/2021 | Henein | |
| 2023/0368590 | A1 | 11/2023 | Sun et al. | |

FOREIGN PATENT DOCUMENTS

| | | | |
|---|---|---|---|
| JP | 4788640 | B2 | 10/2011 |
| WO | 2009065549 | A1 | 5/2009 |
| WO | 2013102916 | A1 | 7/2013 |
| WO | 2014123993 | A1 | 8/2014 |
| WO | 2021093769 | A1 | 5/2021 |

OTHER PUBLICATIONS

Amezcua et al., "Accelerometer-Based Estimation of Combustion Features for Engine Feedback Control of Compression-Ignition Direct-Injection Engines," SAE Technical Paper, Apr. 2020, 9 pp.

Ayati et al., "Classification-Based Fuel Injection Fault Detection of a Trainset Diesel Engine Using Vibration Signature Analysis," Journal of Dynamic Systems Measurement and Control, Feb. 2020, 12 pp.

Baghban et al., "Improved Estimation of Cetane Number of Fatty Acid Methyl Esters (FAMEs) Based Biodiesels Using TLBO-NN and PSO-NN Models," Fuel, vol. 232, Nov. 2018, pp. 620-631.

Bao et al., "Experimental Study of the Polytropic Index of the Compression Stroke for a Direct Injection Hydrogen Engine," International Journal of Hydrogen Energy, vol. 45, No. 52, Oct. 2020, pp. 28196-28203.

Bemani et al., "Modeling of Cetane Number of Biodiesel from Fatty Acid Methyl Ester (FAME) Information Using GA-, PSO-, and HGAPSO-LSSVM Models," Renewable Energy, vol. 150, May 2020, pp. 924-934.

Bizon et al., "Reconstruction of In-Cylinder Pressure in a Diesel Engine from Vibration Signal Using a RBF Neural Network Model," SAE Technical Paper, Sep. 11, 2011, 12 pp.

Bohn et al., "State Observer Based Analysis of Crankshaft Speed Measurements with Application to Misfire Detection," 2005 International Conference on Control and Automation ICCA2005, Jun. 27-29, 2005, pp. 239-244.

Brunt et al., "Calculation of Heat Release in Direct Injection Diesel Engines," AE Technical Paper 1999-01-0187, International Congress and Exposition, Mar. 1-4, 1999, 17 pp.

Businaro et al., "Accelerometer Based Methodology for Combustion Parameters Estimation," Energy Procedia, vol. 81, Dec. 2015, pp. 950-959.

Cai et al., "Fault Detection and Diagnostic Method of Diesel Engine by Combining Rule-Based Algorithm and BNs/BPNNs," Journal of Manufacturing Systems, vol. 57, Oct. 2020, pp. 148-157.

Chauvin et al., "Real-Time Combustion Parameters Estimation for HCCI-Diesel Engine Based on Knock Sensor Measurement," The International Federation of Automatic Control, vol. 41, Jul. 6-11, 2008, pp. 8501-8507.

Chiatti et al., "Accelerometer Measurement for MFB Evaluation in Multi-Cylinder Diesel Engine," Energy, vol. 133, Aug. 15, 2017, pp. 843-850.

Chiavola et al., "Combustion Characterization in Diesel Engine via Block Vibration Analysis," SAB Technical Paper, Apr. 12, 2010, 9 pp.

Cressie, "The Origins of Kriging," Mathematical Geology, vol. 22, No. 3, Apr. 1990, pp. 239-252.

Di Pasquale et al., "FEREBUS: Highly Parallelized Engine for Kriging Training," Journal of Computational Chemistry, vol. 37, No. 29, Nov. 2016, pp. 2606-2616.

Du et al., "Reconstructing Cylinder Pressure from Vibration Signals Based on Radial Basis Function Networks," Proceedings of the Institution of Mechanical Engineers, Part D: Journal of Automobile Engineering, vol. 215, No. 6, Jun. 2001, pp. 761-767.

Dykas et al., "Acoustic Emission Characteristics of a Single Cylinder Diesel Generator at Various Loads and with a Failing Injector," Mechanical Systems and Signal Processing, vol. 93, Sep. 2017, pp. 397-414.

El-Ghamry et al., "The Development of Automated Pattern Recognition and Statistical Feature Isolation Techniques for the Diagnosis of Reciprocating Machinery Faults Using Acoustic Emission," Mechanical Systems and Signal Processing, vol. 17, No. 4, Jul. 2003, pp. 805-823.

Fang et al., "Closed-Loop Combustion Phase Control for Multiple Combustion Modes by Multiple Injections in a Compression Ignition Engine Fueled by Gasoline-Diesel Mixture," Applied Energy, vol. 231, Sep. 2018, pp. 816-825.

Gao et al., "On-Line Statistical Combustion Phase Optimization and Control of SI Gasoline Engines," Applied Thermal Engineering, vol. 112, Feb. 5, 2017, pp. 1396-1407.

Gao et al., "Reconstruction of Diesel Engine Cylinder Pressure Using a Time Domain Smoothing Technique," Mechanical Systems and Signal Processing, vol. 13, No. 5, Sep. 1999, pp. 709-722.

Gao et al., "SOC Detection of Diesel Engines Based on Online Estimation of Motored Pressure," ASME 2013 Internal Combustion Engine Division Fall Technical Conference,.Oct. 13-16, 2013.

Giakoumis et al., "Estimation of Biodiesel Cetane Number, Density, Kinematic Viscosity and Heating Values from its Fatty Acid Weight Composition," Fuel, vol. 222, Jun. 2018, pp. 574-585.

Gill et al., "A Study of Small HSDI Diesel Engine Fuel Injection Equipment Faults using Acoustic Emission," Journal of Acoustic Emission (Journal-AE), vol. 18, Mar. 2014, 6 pp.

Gu et al., "Non-Parametric Models in the Monitoring of Engine Performance and Condition Part 2: Non-Intrusive Estimation of Diesel Engine Cylinder Pressure and its Use in Fault Detection," Proceedings of the Institution of Mechanical Engineers, Part D, vol. 213, No. 2, Feb. 1999, pp. 135-143.

Halbe et al., "Control-Oriented Premixed Charge Compression Ignition CA50 Model for a Diesel Engine Utilizing Variable Valve Actuation," International Journal of Engine Research, vol. 18, No. 8, Dec. 1, 2016, pp. 847-857.

Han et al., "Recursive Engine In-Cylinder Pressure Estimation Using Kalman Filter and Structural Vibration Signal," IFAC PapersOnLine, vol. 51, No. 31, 2018, (Applicant points out, in accordance with MPEP 609.04(a), that the year of publication, 2018, is sufficiently earlier than the effective U.S. filing date, so that the particular month of publication is not in issue.) pp. 700-705.

Han et al., "Virtual Engine In-Cylinder Pressure Sensor for Automobiles and Agricultural Tractors," IFAC—PapersOnLine, vol. 53, No. 1, Jan. 2020, pp. 543-548.

Hountalas et al., "Effect of Pressure Transducer Position on Measured Cylinder Pressure Diagram of High Speed Diesel Engines," Energy Conversion and Management, vol. 39, No. 7, May 1998, pp. 589-607.

Jafari et al., "In-Cylinder Pressure Reconstruction by Engine Acoustic Emission," Mechanical Systems and Signal Processing, vol. 152, May 2021, 9 pp.

Jeon et al., "Accelerometer-Based Robust Estimation of In-Cylinder Pressure for Cycle-to-Cycle Combustion Control," IEEE Transactions on Instrumentation and Measurement, vol. 72, Aug. 2023, 13 pp.

Ji et al., "Combustion Parameter Estimation for ICE from Surface Vibration Using Frequency Spectrum Analysis," Measurement, vol. 128, Nov. 2018, pp. 485-494.

(56) References Cited

OTHER PUBLICATIONS

Jia et al., "Review of Sensing Methodologies for Estimation of Combustion Metrics," Journal of Combustion, vol. 2016, No. 3, Jan. 2016, 9 pp.
Jianmin et al., "Fuel Injection System Fault Diagnosis Based on Cylinder Head Vibration Signal," Procedia Engineering, vol. 16, Dec. 2011, pp. 218-223.
Johnsson et al., "Cylinder Pressure Reconstruction Based on Complex Radial Basis Function Networks from Vibration and Speed Signals," Mechanical Systems and Signal Processing, vol. 20, No. 8, Nov. 2006, pp. 1923-1940.
Jones et al., Efficient Global Optimization of Expensive Black-Box Functions, Journal of Global optimization, vol. 13, No. 4, pp., Dec. 1998, pp. 455-492.
Jung et al., "Closed-Loop Control for Diesel Combustion Noise Using Engine Vibration Signals," SAE Technical Paper, Jun. 15, 2015, 7 pp.
Khazaee et al., "Fault Detection of Engine Timing Belt Based on Vibration Signals using Data-Mining Techniques and a Novel Data Fusion Procedure," Structural Health Monitoring, vol. 15, No. 5, Jun. 2016, pp. 583-598.
Klein et al., "Estimation of the Cylinder Pressure Offset and Polytropic Exponent Using Extended Kalman Filter," IFAC Proceedings Volumes, vol. 40, No. 10, Aug. 2007, pp. 175-182.
Kobori et al., "A Study of Ignition Delay of Diesel Fuel Sprays," International Journal of Engine Research, vol. 1, No. 1, Feb. 2000, pp. 29-39.
Krause et al., "Vibration-Based Measurement of Activated Cylinders in Reciprocating Machines," IEEE Transactions on Instrumentation and Measurement, vol. 72, No. 7500415, Oct. 2022, pp. 1-15.
Kyrtatos et al., "Cycle-to-Cycle Variations in Diesel Engines," Applied Energy, vol. 171, Jun. 2016, pp. 120-132.
Lee et al., "Reduction of Engine Emissions via a Real-Time Engine Combustion Control with an EGR Rate Estimation Model," International Journal of Automotive Technology, vol. 18, No. 4, Aug. 2017, pp. 571-578.
Leonhardt et al., "Methods for Engine Supervision and Control based on Cylinder Pressure Information," IEEE/ASME Transactions on Mechatronics, vol. 4, No. 3, Sep. 1999, 15 pp.
Li et al., "A New Swarm Intelligence Optimized Multiclass Multi-Kernel Relevant Vector Machine: An Experimental Analysis in Failure Diagnostics of Diesel Engines," Structural Health Monitoring, vol. 17, No. 6, Dec. 2017, 1503-1519.
Li et al., Effects of Diesel Pre-Injection on the Combustion and Emission Characteristics of a Common-Rail Diesel Engine Fueled with Diesel-Methanol Dual-Fuel, Fuel, vol. 290, Apr. 15, 2021, 12 pp.
Lin et al., "Condition Monitoring and Diagnosis of Injector Faults in a Diesel Engine Using In-Cylinder Pressure and Acoustic Emission Techniques," Conference: the 14th Asia Pacific Vibration Conference, Dec. 2011, 10 pp.
Liu et al., "A Fourier Analysis Based Synthetic Method for In-cylinder Pressure Estimation," SAE Technical Paper, Powertrain & Fluid Systems Conference & Exhibition, Oct. 16-19, 2006, 10 pp.
Liu et al., "A Method of Acoustic Emission Source Location for Engine Fault Based on Time Difference Matrix," Structural Health Monitoring, vol. 22, No. 1, May 24, 2022, pp. 621-638.
Liu et al., "A Novel Adaptive Fault Diagnosis Algorithm for Multi-Machine Equipment: Application in Bearing and Diesel Engine," Structural Health Monitoring, vol. 22, No. 3, Aug. 4, 2022, pp. 1677-1707.
McGann et al., "Effect of the Cetane Number on Jet Fuel Spray Ignition at High-Temperature and -Pressure Conditions," Energy Fuels, vol. 34, Jan. 10, 2020, pp. 1337-1346.
Min et al., "Autoignition of Varied Cetane Number Fuels at Low Temperatures," Proceedings of the Combustion Institute, vol. 37, No. 4, Jun. 2018, pp. 5003-5011.
Moro et al., "In-Cylinder Pressure Reconstruction Based on Instantaneous Engine Speed Signal," Journal of Engineering for Gas Turbines and Power, vol. 124, No. 1, Jan. 2002, pp. 220-225.
Murphy et al., "Effects of Cetane Number on Jet Fuel Combustion in a Heavy-Duty Compression Ignition Engine at High Load," SAE Technical Paper, Apr. 12, 2011, 14 pp.
Nelder et al., "A Simplex Method for Function Minimization," The Computer Journal, vol. 7, No. 4, Jan. 1965, pp. 308-313.
Nelson et al., "Accelerometer-Based Acoustic Control: Enabling Auscultation on a Black Hawk Helicopter," IEEE/ASME Transactions on Mechatronics, vol. 22, No. 2, Apr. 2017, pp. 994-1003.
Ofner et al., "In-Cylinder Pressure Reconstruction from Engine Block Vibrations via a Branched Convolutional Neural Network," Mechanical Systems and Signal Processing, vol. 183, No. 7, Jan. 2023, 10 pp.
Olsson et al., "The Nelder-Mead Simplex Procedure for Function Minimization," Technometrics, vol. 17, No. 1, Feb. 1975, pp. 45-51.
Pal et al., "Constrained Surrogate-Based Engine Calibration Using Lower Confidence Bound," IEEE/ASME Transactions on Mechatronics, vol. 26, No. 6, Dec. 2021, pp. 3116-3127.
Panzani et al., "Engine Knock Margin Estimation Using In-Cylinder Pressure Measurements," IEEE/ASME Transactions on Mechatronics, vol. 22, No. 1, Feb. 2017, 11 pp.
Payri et al., "Digital Signal Processing of In-Cylinder Pressure for Combustion Diagnosis of Internal Combustion Engines," Mechanical Systems and Signal Processing, vol. 24, No. 6, Aug. 2010, pp. 1767-1784.
Pla et al., "Adaptive In-Cylinder Pressure Model for Spark Ignition Engine Control," Fuel, vol. 299, Sep. 1, 2021, 8 pp.
Polonowski et al., "Accelerometer Based Sensing of Combustion in a High Speed HPCR Diesel Engine," SAE Transactions, vol. 116, 2007 World Congress, Apr. 16-19, 2007, 18 pp.
Ponti et al., "Remote Combustion Sensing Methodology for Non-Intrusive Cylinder Pressure Estimation in Diesel Engines," 7th IFAC Symposium on Advances in Automotive Control the International Federation of Automatic Control Sep. 4-7, 2013, pp. 353-359.
Randall et al., "Diesel Engine Cylinder Pressure Reconstruction," Proceedings of 21st International Seminar of Modal Analysis Noise and Vibration Engineering, vol. 2, Sep. 18-20, 1996, pp. 847-856.
Saldana et al., "Flash Point and Cetane Number Predictions for Fuel Compounds Using Quantitative Structure Property Relationship (QSPR) Methods," Energy & Fuels, vol. 25, No. 9, Sep. 2011, pp. 3900-3908.
Schten et al., "Design of an Automotive Grade Controller for In-Cylinder Pressure Based Engine Control Development," SAE Technical Paper, 2007 World Congress, Apr. 16-19, 2007, 11 pp.
Sen et al., "Analysis of Cycle-to-Cycle Pressure Oscillations in a Diesel Engine," Mechanical Systems and Signal Processing, vol. 22, Feb. 2008, pp. 362-373.
Shahid et al., "Real-Time Abnormality Detection and Classification in Diesel Engine Operations with Convolutional Neural Network," Expert Systems with Applications vol. 192, Apr. 15, 2022, 11 pp.
Sharma et al., "Misfire Detection in an IC Engine Using Vibration Signal and Decision Tree Algorithms," Measurement, vol. 50, Apr. 2014, pp. 370-380.
Shirazi et al., "Application of Discrete Wavelet Transform (DWT) in Combustion Failure Detection of IC Engines," 2007 5th International Symposium on Image and Signal Processing and Analysis, Sep. 27-29, 2007, pp. 482-486.
Syta et al., "Detection of Cylinder Misfire in an Aircraft Engine Using Linear and Non-Linear Signal Analysis," Measurement, vol. 174, No. 108982, Jan. 2021, 10 pp.
Taghizadeh-Alisaraei et al., "Characterization of Engine's Combustion-Vibration Using Diesel and Biodiesel Fuel Blends by Time-Frequency Methods: A Case Study," Renewable Energy, vol. 95, Apr. 2016, pp. 422-432.
Taghizadeh-Alisaraei et al., "Vibration Analysis of a Diesel Engine using Biodiesel and Petrodiesel Fuel Blends," Fuel, vol. 102, Dec. 2012, pp. 414-422.
Tunestal et al., "Model-Based Estimation of Cylinder Pressure Sensor Offset using Least-Squares Methods," In Proceedings of the 40th IEEE Conference on Decision and Control, vol. 4, Dec. 2001, pp. 3740-3745.

(56) References Cited

OTHER PUBLICATIONS

Vong et al., "Engine ignition signal diagnosis with Wavelet Packet Transform and Multi-class Least Squares Support Vector Machines," Expert Systems with Applications, vol. 38, No. 7, Jul. 2011, pp. 8563-8570.
Vulli et al., "Time-Frequency Analysis of Single-Point Engine-Block Vibration Measurements for Multiple Excitation-Event Identification," Journal of Sound and Vibration, vol. 321, No. 3-5, Apr. 2009, pp. 1129-1143.
Wang et al., "A New Method of Estimating Derived Cetane Number for Hydrocarbon Fuels," Fuel, vol. 241, Apr. 2019, pp. 319-326.
Wen et al., "Ca50 Estimation Based on Neural Network and Smooth Variable Structure Filter," ISA transactions, vol. 114, Aug. 2021, 499-507.
Wu et al., "Continuous Wavelet Transform Technique for Fault Signal Diagnosis of Internal Combustion Engines," NDT & E International, vol. 39, No. 4, Jun. 2006, pp. 304-311.
Wu et al., "Investigation of Engine Fault Diagnosis Using Discrete Wavelet Transform and Neural Network," Expert Systems with Applications, vol. 35, No. 3, Oct. 2008, pp. 1200-1213.
Yang et al., "Fault Detection in a Diesel Engine by Analysing the Instantaneous Angular Speed," Mechanical Systems and Signal Processing, vol. 15, No. 3, May 2001, pp. 549-564.
Zabihi-Hesari et al., "Fault Detection and Diagnosis of a 12-Cylinder Trainset Diesel Engine Based on Vibration Signature Analysis and Neural Network," Journal of Mechanical Engineering Science, Jun. 2018, 14 pp.
Zhang et al., "Intelligent Diagnosis of V-Type Marine Diesel Engines Based on Multifeatures Extracted From Instantaneous Crankshaft Speed," in IEEE Transactions on Instrumentation and Measurement, vol. 68, No. 3, Mar. 2019, pp. 722-740.

* cited by examiner

COMPRESSION IGNITION ENGINE CONTROL

This application claims priority from U.S. Provisional Application Ser. No. 63/375,344, filed Sep. 12, 2022, which is incorporated herein by reference in its entirety.

GOVERNMENT INTEREST his invention was made with government support under W911NF-20-2-0161 awarded by, the Army Research Office. The government has certain rights in the invention.

TECHNICAL FIELD

This disclosure generally relates to compression ignition engines and, in particular, to systems for controlling compression ignition engines.

BACKGROUND

In-cylinder combustion pressure and other combustion variables such as cumulative heat release and the crank angle at which 50% of combustion heat release has occurred (CA50) are used for closed-loop combustion control of combustion-ignition (CI) engines. Real-time engine combustion controls use these combustion variables to improve engine efficiency, reduce harmful engine emissions, and enable fault diagnostics. Typically, in-cylinder pressure is measured directly using a pressure sensor. The high temperature and harsh conditions inside an engine cylinder, however, limit the lifetime of such internally placed pressure sensors. Further, the sensors add to the cost of the propulsion system and pose challenges in having to find locations for mounting and for interfacing with such sensors.

SUMMARY

In general, the present disclosure describes techniques for controlling a CI engine based on an estimate of the in-cylinder combustion pressure for each cylinder of the CI engine. The present techniques provide an estimate of the in-cylinder combustion pressure for each cylinder in near real-time. That estimate may then be used by an engine controller to adjust control inputs to maintain robust and efficient engine operation.

This disclosure describes examples of estimation algorithms for in-cylinder pressure and combustion variable estimation using a vibration sensor (e.g., an accelerometer) located external to the cylinder (e.g., on the engine block) and the crankshaft speed sensor. The estimation is oriented towards cycle-to-cycle control of compression-ignition engines in which the variables need to be estimated by the end of one cycle in order for control of the next combustion cycle. Example models described in this disclosure relate a combustion component of a measured acceleration signal (via the vibration sensor) to a combustion component of in-cylinder pressure. This disclosure describes methods to extract the combustion component of both the vibration signal and the in-cylinder pressure. The approach may be used to obtain a model between these combustion components that is low-order, robust and requires less computational effort, allowing an engine controller to estimate in-cylinder pressure and, subsequently, combustion variables such as cumulative heat release and CA50. As a result, the estimated in-cylinder information may be used for cycle-to-cycle feedback of variables for combustion control.

The techniques described herein may, in some example approaches, be used with experimental data obtained by operating a multi-cylinder (4 cylinder) compression-ignition direct-injection engine to obtain measurements from a non-intrusive vibration sensor mounted on the engine block (such as a piezoelectric triaxial accelerometer). The example techniques have been validated for the estimation of in-cylinder pressure and CA50 and include both single and multi-injection cases with a range of experimental data at different speeds, injection timings, injection durations and loads.

Details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
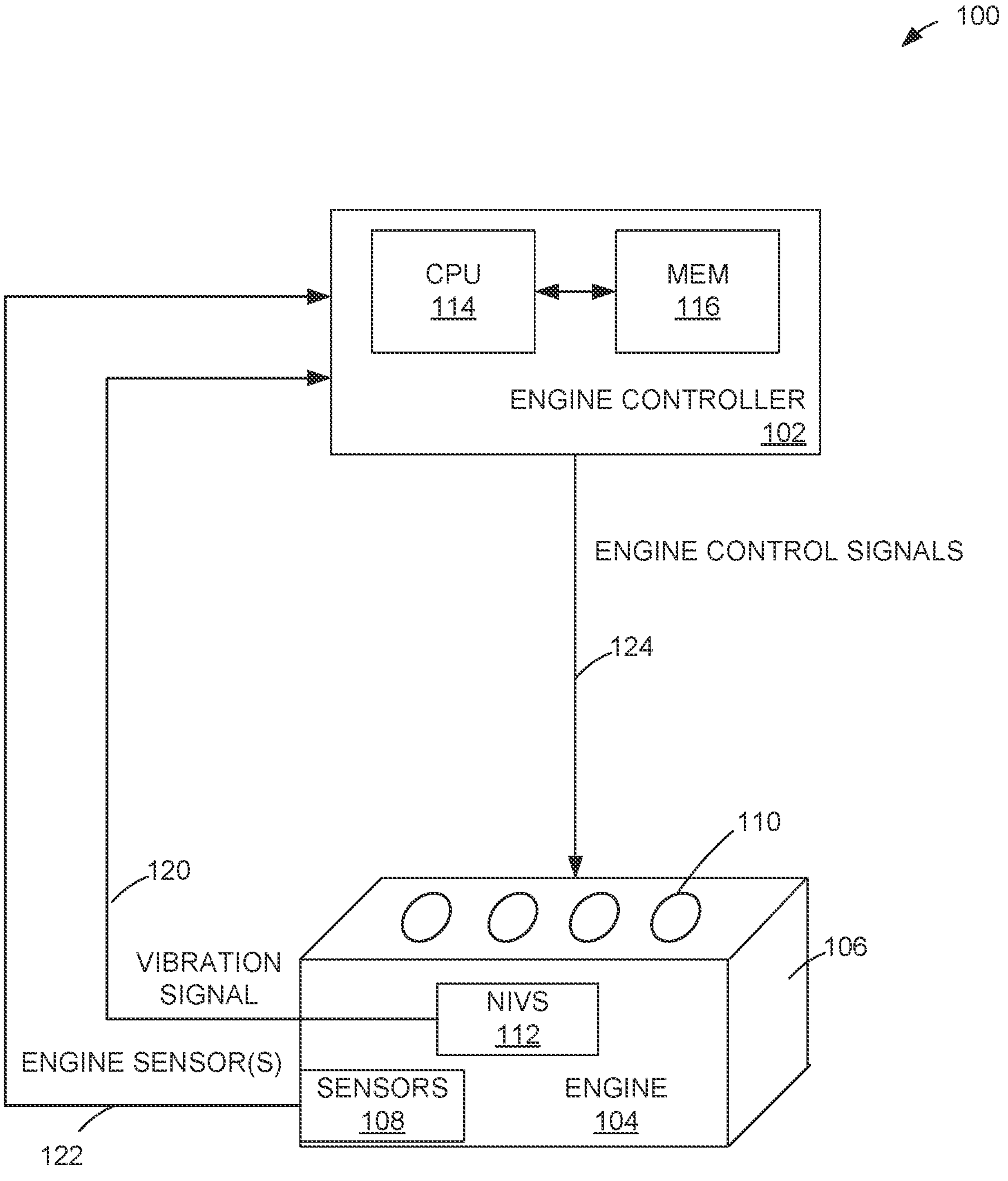
FIG. 1 is a block diagram illustrating an example CI engine system, in accordance with one or more techniques of this disclosure.

As noted above, in-cylinder pressure typically is measured directly using a pressure sensor inserted in each engine cylinder. The high temperature and harsh conditions inside an engine cylinder, however, limit the lifetime of such internal pressure sensors. In addition, the sensors add to the cost and complexity to the design of the CI engine. The present disclosure describes techniques for estimating the in-cylinder pressure without necessarily requiring in-cylinder sensors. However, the inclusion of in-cylinder sensors may be possible. The present disclosure further describes techniques for estimating other combustion variables based on the estimated in-cylinder pressure and techniques for fault diagnostics based on estimated values of such combustion variables.

The description below sets out an example approach for estimating in-cylinder pressure and combustion variables in a CI engine (e.g., diesel engine) using measurements from a non-intrusive vibration sensor located proximate to the engine block. The phrase “non-intrusive” may refer to the vibration sensor being placed external to the cylinder. A “non-intrusive” accelerometer, or more generally a vibration sensor, is provided for purposes of illustration only, and should not be considered limiting. The example techniques may apply to vibration sensors located at various locations on or near a cylinder.

The example approach relates a combustion component of the vibration signal with a combustion component of in-cylinder pressure and is amenable to being represented by a low order linear parameter varying model. A first order differential equation model between these combustion components is described; the model is then used to estimate in-cylinder pressure from vibration measurements. The vibration signal may be composed of a sum of the combustion component and a non-combustion component. The non-combustion component of the vibration signal may be caused by motion of the piston inside the cylinders, while the combustion component of the vibration signal may be caused by energy due to combustion that propagates acoustically through the engine to the vibration sensor. In some examples, the vibration sensor is an accelerometer, and the vibration signal is an acceleration signal from the accelerometer.

In one example approach, the non-combustion component of an acceleration signal is obtained via a finite impulse response model and a real-time adaptive least squares algorithm that utilizes the crankshaft speed signal to find the motion-related component of the acceleration signal. The non-combustion component of the acceleration signal is then subtracted from the total acceleration signal to obtain the combustion component of the acceleration signal. This technique was evaluated externally using data from a turbocharged high speed 4-cylinder compression-ignition direct-injection (CIDI) engine and over 85 data sets of different operating conditions involving both single and multi-injection. In one example approach, in-cylinder pressure, cumulative heat transfer release and the CA50 values were estimated based on accelerometer data from an accelerometer attached to the engine block of the turbocharged high speed 4-cylinder CIDI engine, with CA50 being a key variable needed for closed-loop cycle-to-cycle combustion control. Results showed that the CA50 value may be estimated accurately with an RMS error of 1.45 degrees in single injection data sets involving 40 different operating conditions and with an RMS error of 3.96 degrees in multi-injection data sets involving 45 different operating conditions.

Accelerometers may be mounted externally on an engine block to obtain structural vibrational data and estimate the in-cylinder combustion information from that vibration data. Previous models have utilized accelerometer-based sensing methods for estimating the in-cylinder pressure during combustion from an accelerometer signal. Previous models have also investigated the optimal location and the most sensitive axis of accelerometer on an engine block that provides the best correlation to the combustion variables. To date, the results have been spotty.

In one example approach, values for in-cylinder pressure and other combustion variables are estimated based on measurements provided by a crankshaft speed sensor and on vibration signals received from a non-intrusive vibration (NIV) sensor located on the engine block. In one example approach, the estimate is used for cycle-to-cycle control of CI engines (such as CIDI engines) in which the variables need to be estimated by the end of one cycle in order for control of the next combustion cycle. In one such example approach, the NIV sensor is an accelerometer. In another such example approach, the NIV sensor is an acoustic emission sensor.

The estimation technique of the present disclosure differs from other attempts to estimate in-cylinder pressure from accelerometer signals in that the estimation technique employs a model relating a combustion component of the measured acceleration signal to a combustion component of in-cylinder pressure. In addition, signal processing methods are described for obtaining the combustion component of both the accelerometer signal and the in-cylinder pressure. The technique results in a model between these combustion components that is low-order, robust and requires less computational effort, enabling the CI engine control system to estimate in-cylinder pressure and other combustion variables, such as cumulative heat release, start of combustion (SOC), CA50 and the crank angle at which 90% of combustion heat release has occurred (CA90). The estimated in-cylinder information may, therefore, be used for cycle-to-cycle feedback of variables for combustion control.

The approach described herein is a method of estimating in-cylinder pressure from measured acceleration; the method relates the combustion component of measured acceleration (i.e., the acceleration signal) to combustion pressure. A technique is described that establishes a low order dynamic model for the relationship between the above two variables, with the use of this model to estimate pressure from accelerometer measurements. In one example approach, the technique also includes a method for computing the combustion component of the accelerometer signal using an adaptive filter technique. In one example approach, the technique also includes an enhancement to the model to enhance accuracy specifically during the period of fuel injection.

The techniques described may be used for real-time combustion control, improvement of engine efficiency, reduction of harmful engine emissions, and fault diagnostics. While in-cylinder pressure may be directly measured using a pressure sensor, such sensors are costly and are subject to high temperature and harsh conditions inside the engine cylinder. Such sensors may also complicate the design of the engine itself. Techniques for reliably estimating in-cylinder pressure and other combustion variables without using an in-cylinder pressure sensor are, therefore, highly beneficial. In addition, the estimated cylinder pressure, and other estimated combustion components may be used in a fault diagnostic system to monitor the functionality and health of in-cylinder sensors.

The example techniques were subjected to extensive evaluation with experimental data obtained by operating a multi-cylinder (4 cylinder) compression-ignition direct-injection engine and obtaining measurements from a piezo-electric triaxial accelerometer mounted on the engine block. The extensive validation for the estimation of in-cylinder pressure and CA50 included both single and multi-injection cases with a range of experimental data at different speeds, injection timings, injection durations and loads.

FIG. 1 is a block diagram illustrating an example CI engine system, in accordance with one or more techniques of this disclosure. In the example shown in FIG. 1, example CI engine system 100 includes a CI engine controller 102 and a CI engine 104. CI engine 104 includes an engine block 106, engine sensors 108 and engine cylinders 110 installed in the engine block 106, and a non-intrusive vibration (NIV) sensor 112 mounted on the engine block 106.

CI engine 104 may be connected to engine controller 102. For example, CI engine 104 may be configured to receive engine control signals 124 from engine controller 102. Engine control signals 124 may control engine performance, such as injection timing, injection duration, and start of combustion (SOC). CI engine 104 may also be configured to transmit current engine operating condition measurements to engine controller 102. Engine operating condition measurements may include angular position information and other information measured by sensors of engine 104 (e.g., by sensors 108 and/or NIV sensor 112).

CI engine controller 102 may receive a vibration signal 120 from NIV sensor 112 and one or more engine sensor signals from sensors 108. Although not pictured in FIG. 1, in some examples engine controller 102 may receive other signals or information from CI engine 104 as well (e.g., engine operating condition measurements). In one example approach, vibration signal 120 may be an accelerometer signal generated when the NIV sensor 112 is an accelerometer. In another example approach, vibration signal 120 may be an acoustic emission signal generated when the NIV sensor 112 is an acoustic emission sensor. Other NIV sensors 112 may be used as needed to obtain the desired vibration signal. Engine controller 102 may receive a vibration signal 120 from NIV sensor 112 and engine sensor signals 122 from CI engine 104 and generate engine control signals 124. In one example approach, engine controller 102 may estimate in-cylinder pressure, cumulative heat transfer release and CA50, with CA50 being a key variable needed for closed-loop cycle-to-cycle combustion control.

In one example approach, engine controller 102 includes a at least one processor, such as CPU 114, connected to memory 116. Memory 116 may include program code that, when executed by CPU 114, estimates the in-cylinder pressure of one or more cylinders 110 of CI engine 104. In one such example approach, CPU 114 may receive signals from engine 104, including signals from non-intrusive vibration sensor 112 and engine sensors 108, and determine the in-cylinder pressure of one or more cylinders 110 of CI engine 104. In some examples, processor 224 may determine the in-cylinder pressure of one or more cylinders 110 based on the angular position information received from engine 104 and a combustion component of vibration signal 120.

Figure 2:
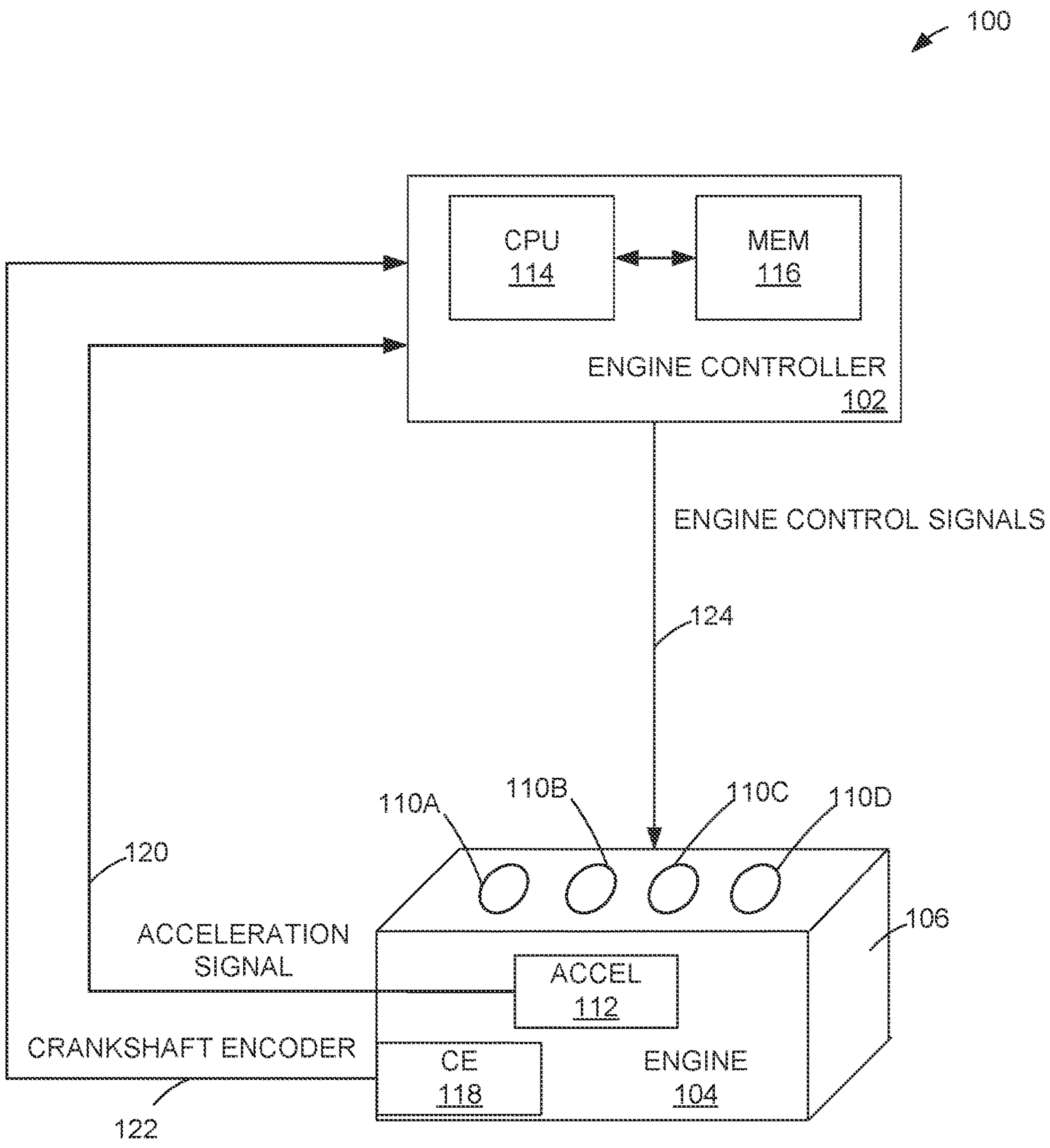
FIG. 2 is a block diagram illustrating one example approach to the example CI engine system of FIG. 1, in accordance with one or more techniques of this disclosure.

FIG. 2 is a block diagram illustrating one example approach to the example CI engine system of FIG. 1, in accordance with one or more techniques of this disclosure. In the example shown in FIG. 2, example CI engine system 100 includes a CI engine controller 102 and a CI engine 104. CI engine 104 includes an engine block 106, engine sensors 108 and engine cylinders 110A-D (collectively cylinders 110) installed in the engine block 106. In the example shown in FIG. 2, NIV sensor 112 is an accelerometer (accelerometer 112) mounted on the engine block 106 and vibration signal 120 is an acceleration signal (acceleration signal 120). In the example approach of FIG. 2, engine sensors 108 include a crankshaft encoder 118 used to measure the crankshaft angular position of engine 104.

In some examples, accelerometer 112 may be mounted at engine block 106 exhaust side between a first and second cylinder of cylinders 110 (e.g., cylinders 110B and 110C) of engine 104. In some examples, accelerometer 112 may be a piezoelectric triaxial accelerometer mounted at engine block 106 exhaust side with a location 8.9 cm from the fire deck. In examples where accelerometer 112 is located between a first and second cylinder of cylinders 110, accelerometer 112 may measure accelerometer signals due to engine operations in both cylinders. Engine controller 102 (e.g., via CPU 114) may split accelerometer signal 120 into two sections, wherein a first section represents accelerometer signal 120 corresponding to the first cylinder and the second section represents accelerometer signal 120 corresponding to the second cylinder. In some examples, a single accelerometer 112 may measure signals due to engine operations in any number of cylinders 110 of engine 104, and engine controller 102 may split accelerometer signal 120 into an equivalent number of sections, each section representing a portion of accelerometer signal 120 corresponding to a different cylinder of cylinders 110.

In one example approach, CI engine controller 102 receives acceleration signal 120 from accelerometer 112, receives crankshaft encoder signal 122 from crankshaft encoder 118, and generates engine control signals 124. CI engine 104 may receive engine control signals 124 which, in some examples, control parameters of engine performance such as injection timing, injection duration and start of combustion (SOC). In one example approach, engine controller 102 estimates in-cylinder pressure, cumulative heat transfer release and CA50, with CA50 being a key variable needed for closed-loop cycle-to-cycle combustion control.

In one example approach, engine controller 102 in FIG. 2 includes a processor, such as CPU 114, connected to memory 116. Memory 116 includes program code that, when executed by processor 114, estimates the in-cylinder pressure of one or more of cylinders 110 of CI engine 104. In one such example approach, processor 114 receives signals from accelerometer 112 and from crankshaft encoder 118 and estimates the in-cylinder pressure of one or more of cylinders 110 of CI engine 104.

In one example approach, CI engine 104 may be a turbocharged high speed 4-cylinder compression-ignition direct-injection (CIDI) engine. Engine crank angle may be acquired from the engine using an optical shaft encoder (BEI, 2048 ticks per revolution). In-cylinder pressure may be measured by piezoelectric pressure transducers (Kistler, 6058) that are connected to charge amplifiers (Kistler, 5010). The engine specifications of the engine 104 used in one example approach are shown in Table 1.

TABLE 1

Engine Specifications

| | |
|---|---|
| Type | General Motors Z19DTH |
| Bore (mm) | 82 |
| Stroke (mm) | 90.4 |
| Displacement (L) | 1.9 |
| Power Output (kW) | 110 |
| Compression Ratio | 17.5 |
| Injection Pump | Bosch CP1H3 |
| Common Rail Injectors | Bosch Crin2, 148° include angle 7 holes, 440 flow |

Tests performed on the above engine showed that, in some example approaches, the CA50 value is estimated accurately with an RMS error of 1.45 degrees in single injection data sets involving 40 different operating conditions and an RIMS error of 3.96 degrees in multi-injection data sets involving 45 different operating conditions.

In one example approach, estimation algorithms for the in-cylinder pressure and CA50 in each of cylinders 110 of diesel engine 104 are developed using measurements from an NIV sensor (e.g., accelerometer 112) located on engine block 106 and a crankshaft speed sensor (e.g., one of sensors 108 of FIG. 1). A diesel engine is one example of CI engine 104.

The technique takes advantage of the fact that combustion causes acoustic wave propagation along engine block 106, which may also be measured by accelerometer 112. Other vibration signals may also be measured by accelerometer 112 (or other NIV sensor), for example, piston motion, but they are not combustion related. A model was derived for the relation between purely the combustion component of the acceleration signal and the combustion component of in-cylinder pressure.

Total vibration is a combination of a combustion component of vibration and a non-combustion component of vibration. If the vibration signal is from accelerometer 112, total acceleration (acceleration signal 120) is a combination of a combustion component of acceleration and a non-combustion component of acceleration. Likewise, total in-cylinder pressure is a combination of a combustion component of in-cylinder pressure and a non-combustion component of in-cylinder pressure. The non-combustion component of in-cylinder pressure is known as motored pressure; motored pressure is the pressure in a cylinder in the absence of combustion and occurs purely due to compression and expansion of the air-fuel mixture inside the cylinder due to piston motion.

The motored pressure is one of the intermediate variables needed for calculation of total pressure, after combustion pressure has been estimated. CPU 114 may be configured to determine the motored pressure using e.g., the following approach. Total in-cylinder pressure is a combination of the combustion component of in-cylinder pressure and the non-combustion component of in-cylinder pressure (the motored pressure). When there is no combustion, in-cylinder pressure can be represented well with a polytropic relation:

$$P(\theta)V(\theta)^{\kappa}=\text{constant}$$

where θ is the crankshaft angle, P is the in-cylinder pressure, V is the in-cylinder volume, and κ is the polytropic exponent. Since the constant in the polytropic relation is the same for different pressures and volumes, the following relation is derived:

$$P(\theta_o)V(\theta_o)^{\kappa} = P(\theta)V(\theta)^{\kappa} \Leftrightarrow \log\left\{\frac{P(\theta_o)}{P(\theta)}\right\} = \kappa\log\left\{\frac{V(\theta)}{V(\theta_o)}\right\}$$

where $\theta_0$ is initial crankshaft angle. $\theta_0$ may be selected for the initial pressure and volume data during the compression stroke. In some examples, $\theta_0$ may be in the range from −135 to −60 degrees before top dead center. By using least squares method with the pressure and volume data up to fuel injection time (e.g., from 80 degrees before top dead center), the polytropic exponent κ may be computed. Then, motored pressure is modelled as:

$$P_{motored}(\theta) = \begin{cases} P(\theta), & \theta \le \theta_{inj} \\ P(\theta_{inj})\left\{\frac{V(\theta_{inj})}{V(\theta)}\right\}^{\kappa}, & \theta > \theta_{inj} \end{cases}$$

where $\theta_{inj}$ is crankshaft angle at fuel injection time. The combustion component of in-cylinder pressure can then be obtained (e.g., by CPU 114) as:

$$P_c(k)=P(k)-P_m(k)$$

where $P_c$ is the combustion component of pressure and $P_m$ is the motored component of pressure.

The following description presents signal processing methods used to obtain combustion components of acceleration signal 120 and in-cylinder pressure, and then describes a differential equation model between the combustion component of the acceleration signal and the combustion component of in-cylinder pressure. In the following, the combustion components of the vibration signal (acceleration signal 120) and in-cylinder pressure may be separated from the non-combustion components, with the combustion component of in-cylinder pressure calculated as a function of the combustion component of the vibration signal. Thus, the present disclosure relates the combustion component of vibration to the combustion component of in-cylinder pressure. In addition, the present disclosure describes estimating in-cylinder pressure based on the separation of the vibration signal into a combustion component and a non-combustion component and the estimation of the combustion component of in-cylinder pressure based on the combustion component of the vibration signal. CA 50 may then be estimated based on the estimated in-cylinder pressure obtained by using the model described herein.

Figure 3:
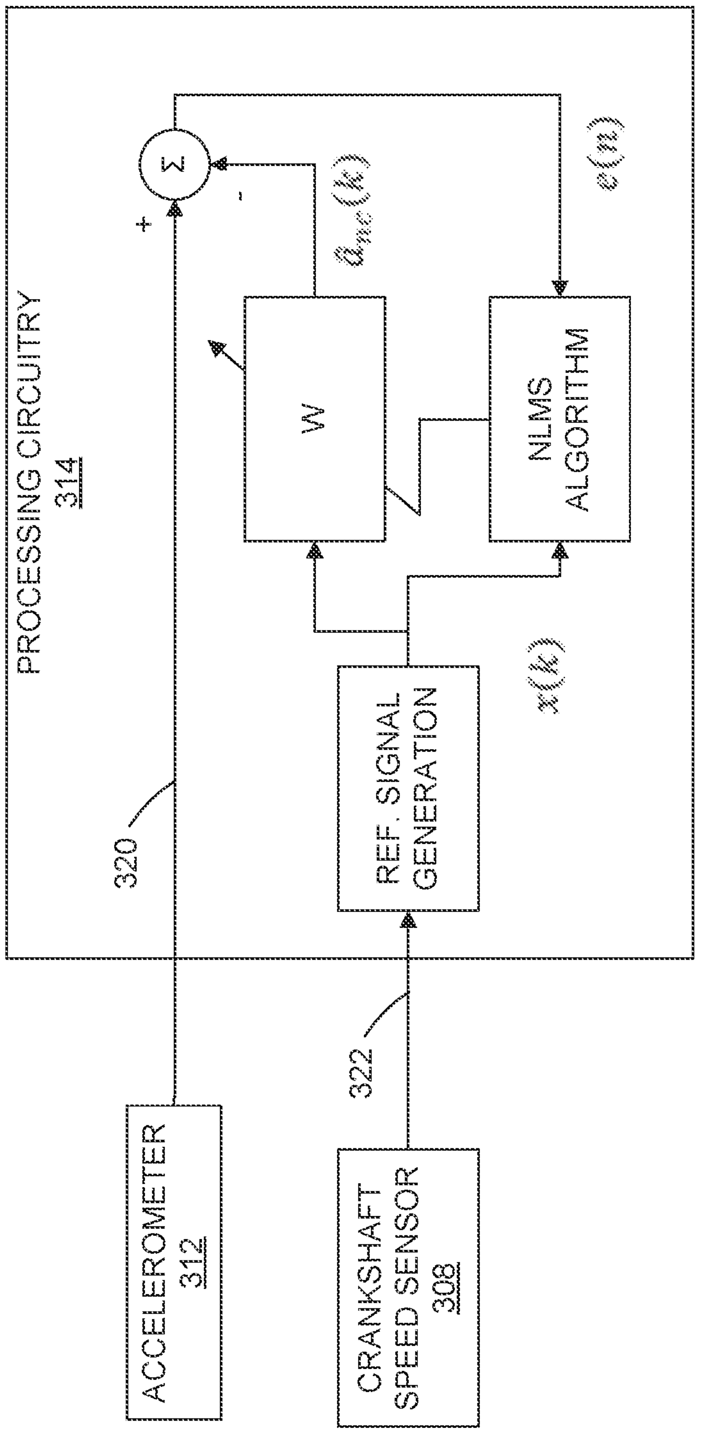
FIG. 3 is an illustration of an algorithm for obtaining a non-combustion component of the acceleration signal using an accelerometer, crankshaft speed sensor, and processing circuitry, in accordance with one or more techniques of this disclosure.

FIG. 3 is an illustration of an algorithm for obtaining a non-combustion component of the acceleration signal using accelerometer 312, crankshaft speed sensor 308, and processing circuitry 314, in accordance with one or more techniques of this disclosure. Accelerometer 312 may be substantially similar to NIVS 112 of FIG. 1 and accelerometer 112 of FIG. 2. In some examples, crankshaft speed sensor 308 may be one of a number of sensors on an engine, e.g., sensors 108 of FIG. 1. In some examples, processing circuitry 314 may be part of a CPU of an engine controller, e.g., CPU 114 of engine controller 102 of FIG. 1. The algorithm of FIG. 3 may be stored in memory and run on processing circuitry 314.

As noted above, acceleration signal 320 contains non-combustion and combustion components:

$$\alpha(k)=\alpha_c(k)+\alpha_{nc}(k)$$

where k is time index, α(k) is acceleration signal 320, $a_c(k)$ is combustion component of acceleration signal, and $a_{nc}(k)$ is non-combustion component of acceleration signal. Accelerometer 312 may send acceleration signal 320 to the engine controller of the engine, for example to processing circuitry 314 of the engine controller. The combustion component of acceleration signal 320 may be obtained by subtracting the non-combustion component of acceleration signal 320 from the total acceleration signal 320.

Since non-combustion component (motored pressure component) of acceleration signal is highly correlated with engine firing frequency, an adaptive filter may be used to estimate the non-combustion component of acceleration signal by using artificially generated reference signal based on engine firing frequency. In one example approach, the firing frequency may be directly obtained from the crankshaft speed:

$$f_n=(n_c/n_r \times RPM)/60$$

where $f_n$ is firing frequency, $n_c$ is the number of cylinders, $n_r$ is the number of rotations per cycle, and RPM is revolution per minute of the crankshaft (e.g., $n_c/n_r=2$ in the case of 2 rotations per cycle for a four-stroke engine):

$$f_n=2\times RPM/60$$

Crankshaft angle θ(k) and crankshaft speed 307 (RPM) may be measured by crankshaft encoder and speed sensor 308, respectively. Crankshaft speed sensor 308 may send crankshaft speed 307 to processing circuitry 314. Hence, reference signal x(k) can be generated as:

$$x(k)=\sin(2\pi f_n t(k))+c$$

where t(k) is time and c is a constant to deal with the offset (bias errors) of acceleration signal 320. The accelerometer may have a slowly varying bias offset value which is influenced by the component of gravity if the engine tilt angle changes. The estimated non-combustion component of acceleration signal 320 may then be modeled using a finite impulse response model as:

$$\hat{a}_{nc}(k)=W^T(k)X(k)$$

where X(k) is the reference signal with length L given by:

$$X(k)=[x(k)x(k-1)\ \dots\ x(k-L+1)]^T$$

and W(k) is an adaptive weight vector as:

$$W(k)=[w_1(k)w_2(k)\ \dots\ w_L(k)]^T$$

In one example approach, the weights may be recursively updated using normalized Least Mean Squares (NLMS) algorithms:

$$W(k+1)=W(k)+\frac{\mu}{\gamma+X^T(k)X(k)}e(k)X(k)$$

where $\gamma>0$, $0<\mu<1$, and $e(k)=a(k)-W^T(k)X(k)$.

The combustion component of acceleration signal 320 may then be obtained as:

$$\hat{a}_c(k)=a(k)-a_{nc}(k)$$

Figure 4:
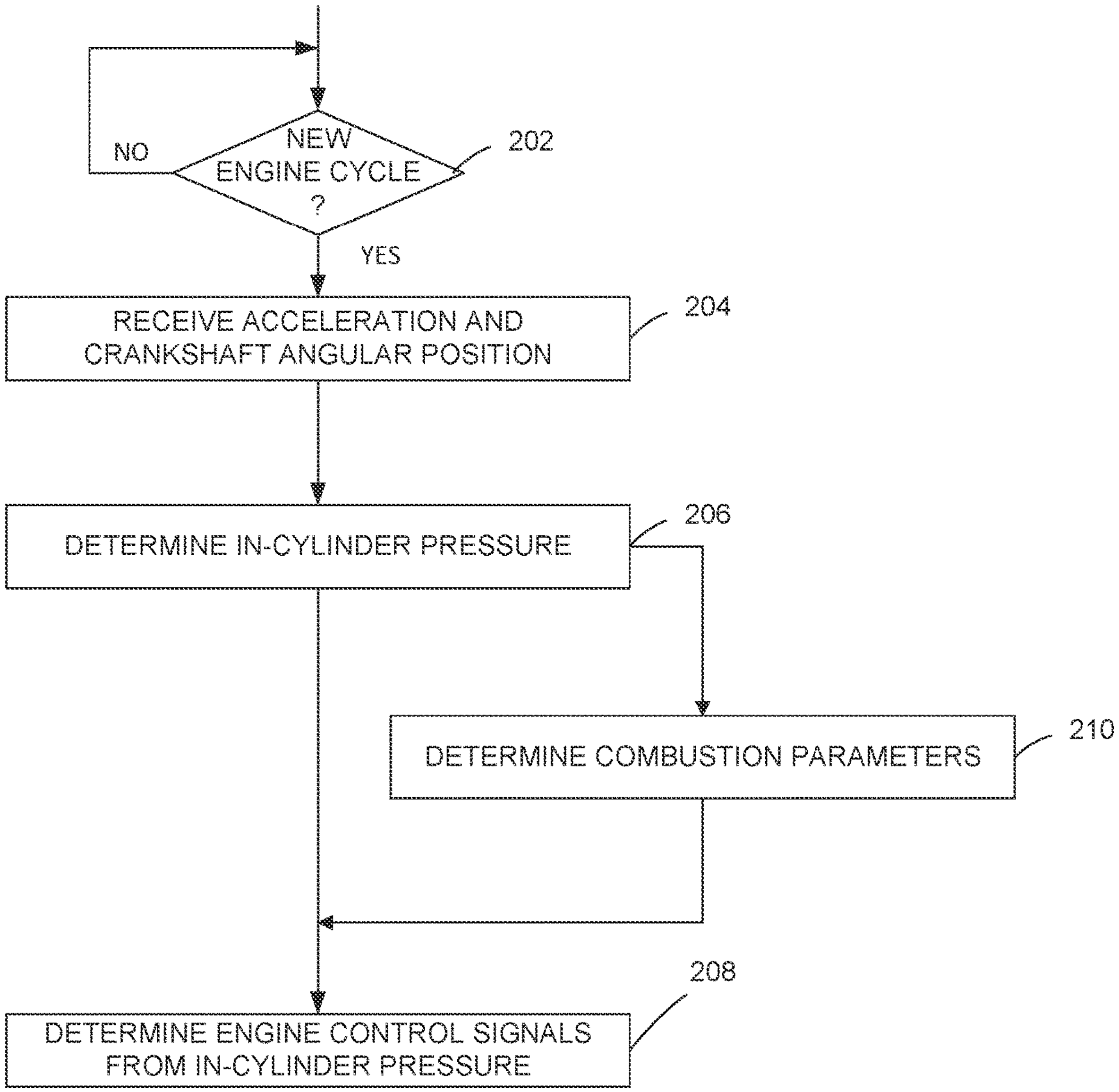
FIG. 4 illustrates a method of determining in-cylinder pressure from the acceleration signals of FIGS. 1-3, in accordance with one or more techniques of this disclosure.

FIG. 4 illustrates a method of determining in-cylinder pressure from the acceleration signals of FIGS. 1-3, in accordance with one or more techniques of this disclosure. In the example shown in FIG. 4, a new cycle is detected (202). CPU 114 in engine controller 102 receives an acceleration signal 120 and a signal relating crankshaft angular position (e.g., crankshaft encoder signal 122 of FIG. 2) from engine 104 (204) and determines in-cylinder pressure (206). CPU 114 then determines engine control signals based on the estimated in-cylinder pressure (208). In some examples. CPU 114 determines combustion parameters based on in-cylinder pressure (210). In examples where CPU 114 determines combustion parameters based on in-cylinder pressure, CPU 114 may determine engine control signals based on both the in-cylinder pressure and the combustion parameters.

Two example approaches for determining combustion pressure using differential equation models relating in-cylinder combustion pressure and the combustion component of accelerometer signal are described next. In the first example approach, the technique is based on the assumption that the vibration/acoustic energy propagated in the engine block to the accelerometer location is proportional to the heat release rate due to combustion in an engine cylinder. In this regard, the heat release rate is a variable containing information about the intensity at which combustion releases the heat energy. The heat release rate obtained from the first law of Thermodynamics is given by:

$$\frac{dQ}{dt}=\frac{\gamma}{\gamma-1}P\frac{dV}{dt}+\frac{1}{\gamma-1}V\frac{dP}{dt}$$

where $\gamma$ is ratio of specific heats. Once combustion occurs, the total pressure can be represented by the combination of the motored pressure and combustion pressure. Then, the heat release rate can be written as:

$$\frac{dQ}{dt}=\frac{\gamma}{\gamma-1}(P_c+P_m)\frac{dV}{dt}+\frac{1}{\gamma-1}V\frac{d(P_c+P_m)}{dt}$$

where $P_c$ is the combustion pressure and $P_m$ is the motored pressure.

The motored pressure may be presented with the polytropic index as $P_m=\lambda V^{-n}$ where the constant $\lambda$ is $P(\theta_{inj})V^n(\theta_{inj})$. Using the chain rule:

$$\frac{dP_m}{dt}=\lambda\frac{dV^{-n}}{dV}\frac{dV}{dt}=-n\lambda V^{-(n+1)}\frac{dV}{dt}$$

and therefore $$\frac{dQ}{dt}=\frac{\gamma}{\gamma-1}P_c\frac{dV}{dt}+\frac{1}{\gamma-1}V\frac{dP_c}{dt}+\frac{\gamma}{\gamma-1}\lambda V^{-n}\frac{dV}{dt}-\frac{n}{\gamma-1}\lambda V^{-n}\frac{dV}{dt}$$

The specific heat ratio may be assumed to be nearly the same as the polytropic index. Therefore, total in-cylinder pressure can be replaced by combustion pressure, resulting in:

$$\frac{dQ}{dt}\cong\frac{\gamma}{\gamma-1}P_c\frac{dV}{dt}+\frac{1}{\gamma-1}V\frac{dP_c}{dt}$$

Then, the following relation may be obtained based on the assumption that intensity of the vibration energy propagated in the engine block to the accelerometer location is proportional to the heat release rate due to combustion in an engine cylinder:

$$\frac{\gamma}{\gamma-1}P_c\frac{dV}{dt}+\frac{1}{\gamma-1}V\frac{dP_c}{dt}\propto E_{vibration}$$

The RMS of the acceleration component related to combustion is an index that measures the intensity of the vibration energy propagated due to combustion. Hence a continuous time model may be obtained:

$$V\frac{dP_c}{dt}+\gamma P_c\frac{dV}{dt}=\Gamma u$$

where u is the moving RMS of the acceleration component related to combustion using a sliding window and $\Gamma$ is a gain. In some examples, $\Gamma=\gamma-1$. The size of the sliding window should be large enough to ensure the signal is smooth, and also small enough to capture changes in the signal sufficiently fast. The cylinder volume and its change rate can be computed from the crankshaft angle, the geometry of the engine, and the sampling time. As a result, a discrete time model can be obtained analytically using the sampling time T (i.e., the time interval between samples):

$$q(k+1)=A_d(k)q(k)+B_d(k)u(k)$$

$$P_c(k)=\Gamma C_d(k)q(k)$$

where q(k) is the state variable, $$A_d = e^{-\frac{\gamma\dot{V}}{V}T},\ B_d = 1,\text{ and } C_d = \left(1 - e^{-\frac{\gamma\dot{V}}{V}T}\right)\Big/(\gamma\dot{V}).$$

More specifically, the above discrete time model may be obtained from the continuous time model in the following way. Time varying variables such as the volume and the rate of volume change can be treated as constants in-between two samples (i.e., during each sampling period). As a result, during each sampling period, a Laplace transform may be applied. By taking a Laplace transform on the continuous time model, the transfer function can be obtained as $$G(s) = \frac{P_c(s)}{U(s)} = \frac{\Gamma/a}{s+b/a}$$

where a=V and b=$\gamma\dot{V}$. Then, the z-domain transfer function (i.e., zero order hold equivalent of G(s)) is defined as $$G(z) = (1-z^{-1})Z\left[\mathcal{L}^{-1}\left\{\frac{G(s)}{s}\right\}\right] = \frac{\Gamma(1-e^{-(b/a)T})/b}{(z-e^{-(b/a)T})}$$

Multiplying q(z) to both the denominator and the numerator of G(z) results in:

$$\frac{P_c(z)}{U(z)} = \frac{\Gamma\left\{\left(1-e^{-\frac{b}{a}T}\right)/b\right\}q(z)}{\left(z-e^{-\frac{b}{a}T}\right)q(z)}$$

therefore:

$$P_c(z) = \Gamma\left\{\left(1-e^{-\left(\frac{\gamma\dot{V}}{V}\right)T}\right)\Big/(\gamma\dot{V})\right\}q(z)$$

$$U(z) = zq(z) - e^{-\left(\frac{\gamma\dot{V}}{V}\right)T}q(z)$$

Finally, the discrete time model can be obtained as $$q(k+1) = e^{-\frac{\gamma\dot{V}}{V}T}q(k) + u(k)$$

$$P_c(k) = \Gamma\left\{\left(1-e^{-\left(\frac{\gamma\dot{V}}{V}\right)T}\right)\Big/(\gamma\dot{V})\right\}q(k)$$

and simplified to:

$$q(k+1)=A_d(k)q(k)+B_d(k)u(k)$$

$$P_c(k)=\Gamma C_d(k)q(k)$$

Experimental data at many different engine rpms, injection durations and single and multiple injections have verified that the above differential equation-based model works well and may be used to estimate the combustion pressure $P_c$ in the cylinder from the accelerometer signal.

The developed model works well during combustion but may be less useful for use during fuel injection. When fuel injection begins, combustion has not yet begun and so the estimation performance may be inaccurate during injection periods. A comparison of estimated combustion pressure of the diesel engine running at 1000 rpm with multiple fuel injection timings (pilot: −18 degrees, main: −6 degrees), and injection durations (pilot: 0.38 ms, main: 0.55 ms) showed that the estimation performance performed less well during the injection periods but was accurate after the end of fuel injection. Therefore, in one example approach, the first model is extended to improve the estimation performance during injection. During the injection period in single injection (or pilot injection period of multi-injection cases), the combustion pressure behavior is approximated by the following exponentially weighted parameter multiplying the acceleration input signal as $$q(k+1) = \alpha\left\{e^{-\frac{\omega}{\beta_1}(k-k_1)} - 1\right\}u(k)$$

$$P_c(k) = \Gamma C_d(k)q(k)$$

and, for multi-injection cases, the combustion pressure during the subsequent main injection period can be estimated by the following model:

$$q(k+1) = A_d(k)q(k) + B_d(k)e^{-\frac{\omega}{\beta_2}(k-k_2)}u(k)$$

$$P_c(k) = \Gamma C_d(k)q(k)$$

Here α is the constant gain, ω is the crankshaft angular speed in revolutions per minute, $k_1$ and $k_2$ are the start time of each fuel injection, and $\beta_1$ and $\beta_2$ are the rate of the exponential weights. The modified model exhibited improved estimation performance, especially during the injection periods. The exponential functions for single and multi-injection cases converge to one with increasing time. Smooth model transition to the combustion-based model can be done using proper selection of parameters $\beta_1$ and $\beta_2$.

In some examples, to find the four parameters Γ, α, $\beta_1$ and $\beta_2$:

1) Set Γ=1, and then estimate the combustion pressure profile $\hat{P}_{c|\Gamma=1}$.
2) Find maximum values of $P_c$ and $\hat{P}_{c|\Gamma=1}$ of each cycle.
3) Find the average normalized $P_c$ and normalized $\hat{P}_{c|\Gamma=1}$ profiles (i.e., $\Gamma=1/\max(\hat{P}_{c|\Gamma=1})$) of a cycle.
4) Find α, $\beta_1$ and $\beta_2$ by conducting curve fitting to the normalized $P_c$ with Γ from 3. Using the estimated combustion pressure, heat release rate may be obtained. Then, cumulative heat release may be computed by conducting numerical integration of the heat release rate. For example, CA50 may be obtained based on the 50% of normalized cumulative heat release.

In some examples, gain Γ may be calculated to account for inter cycle variability to enhance the accuracy of the methods. From one cycle to another the pressure trace and its resulting vibration relationship may vary slightly due to unpredictable effects such as transient changes in the temperature field, errors in fuel injector performance, and changes in the homogeneity of the oil film. The gain to deal with cycle-to-cycle variations of the relationship is correlated with the peak value of the RMS of the acceleration component related to combustion. For example, a gain required to match a peak value of the RMS to peak value of the combustion pressure (i.e., max $P_c$(n)/max u(n), n∈a cycle) versus the peak value of the RMS for the data of each cylinder may be obtained from 100 cycles of engine operation. Therefore, in some examples, different gains for each cycle are utilized, instead of applying a constant gain. The gain may be modeled as a polynomial fun maximum value of u in the cycle:

$$\Gamma = \sum_{i=0}^{m} p_i \{\max u(n)\}^i, \ n \in \text{a cycle}$$

where $p_i$ is the polynomial coefficient and can be computed from a least square method. A first or second order polynomial function may be utilized to develop the above model for gain that is accurate for a wide range of operating conditions.

The second example approach will be described next. The second model is based on the expected acoustic wave propagation equation in the engine block. The relationship between acoustic propagation in a box and the vibration of a flexible panel of the box is:

$$\ddot{p} + 2\xi\omega_n \dot{p} + \omega_n^2 p = -\frac{A_F}{V}\ddot{w}_n$$

where w is the plate deflection and n is the resonant acoustic wave number.

Since the non-intrusive sensing application involves one-dimensional wave propagation in a solid rather than resonant stationary acoustic waves in an enclosure, the type of relationship expected between in-cylinder pressure (acoustic pressure) and acceleration at the sensor location is as follows:

$$\ddot{P} + b\dot{P} = Ka$$

where a is acceleration and P is pressure with parameters b and K that are functions of combustion parameters in the engine. In general, the above equation was found to work reasonably but led to noise-prone pressure estimates. Further, it requires two parameters K and b to be identified for each operating condition, while the first model requires only one unknown parameter Γ to be identified.

Calculation of combustion parameters will be discussed next. Based on a selected one of the above two models, CPU 114 may determine combustion parameters SOC, CA50 and CA90 (210). Using the heat release rate (HRR) equation:

$$\frac{dQ}{dt} = \frac{\gamma}{\gamma-1}P\frac{dV}{dt} + \frac{1}{\gamma-1}V\frac{dP}{dt}$$

the instantaneous heat release rate may be computed if the combustion pressure P, the volume V (a function of the crankshaft angle) and the ratio γ are known.

First, integrate the HRR equation to find the cumulative heat release (CHR):

$$CHR(t) = \int_0^t \left[\frac{\gamma}{\gamma-1}P\frac{dV}{dt} + \frac{1}{\gamma-1}V\frac{dP}{dt}\right]dt$$

Next, determine the normalized CHR in each operating engine cycle by dividing the CHR(t) with the maximum value of CHR. Then, the crank angle at which the normalized CHR has a value of 0.5 is the crank angle at which 50% of the heat release has occurred. This value is computed and designated as the CA50 value.

The crank angle at which the normalized CHR has a value of 0.2 is the crank angle at which 20% of the heat release has occurred. This value is computed and designated as the CA20 value. In some examples, the SOC value is determined as an offset from the CA20 value. In some examples, the SOC value is determined as the crank angle at which 10% of the heat release has occurred. In some examples, the SOC value is determined as the crank angle at which 15% of the heat release has occurred. In some examples, the SOC value is determined as the crank angle at which 20% of the heat release has occurred. In some examples, the SOC is determined as an increase in combustion pressure above a threshold. Finally, the crank angle at which the normalized CHR has a value of 0.9 is the crank angle at which 90% of the heat release has occurred. This value is computed and designated as the CA90 value.

In some examples, CPU 114 may determine combustion parameters SOC, CA50 and CA90 without first estimating in-cylinder pressure. For example, as described above, the heat release rate can be written as:

$$\frac{dQ}{dt} \cong \frac{\gamma}{\gamma-1}P_c\frac{dV}{dt} + \frac{1}{\gamma-1}V\frac{dP_c}{dt}$$

Because the intensity of the vibration energy propagated in the engine block to the accelerometer location is proportional to the heat release rate due to combustion in an engine cylinder:

$$\frac{\gamma}{\gamma-1}P_c\frac{dV}{dt} + \frac{1}{\gamma-1}V\frac{dP_c}{dt} \propto E_{vibration}$$

and therefore:

$$\frac{dQ}{dt} \propto E_{vibration}$$

As describe above, the RMS of the combustion component of acceleration is an index that measures the intensity of the vibration energy propagated due to combustion. Hence the heat release rate, $$\frac{dQ}{dt},$$

may be determined from the RMS of the combustion component of acceleration. As described above, integration of the heat release rate results in a measure of cumulative heat release. As the combustion parameters may be determined from the cumulative heat release, the combustion parameters may be determined directly from the combustion component of acceleration.

Figure 5:
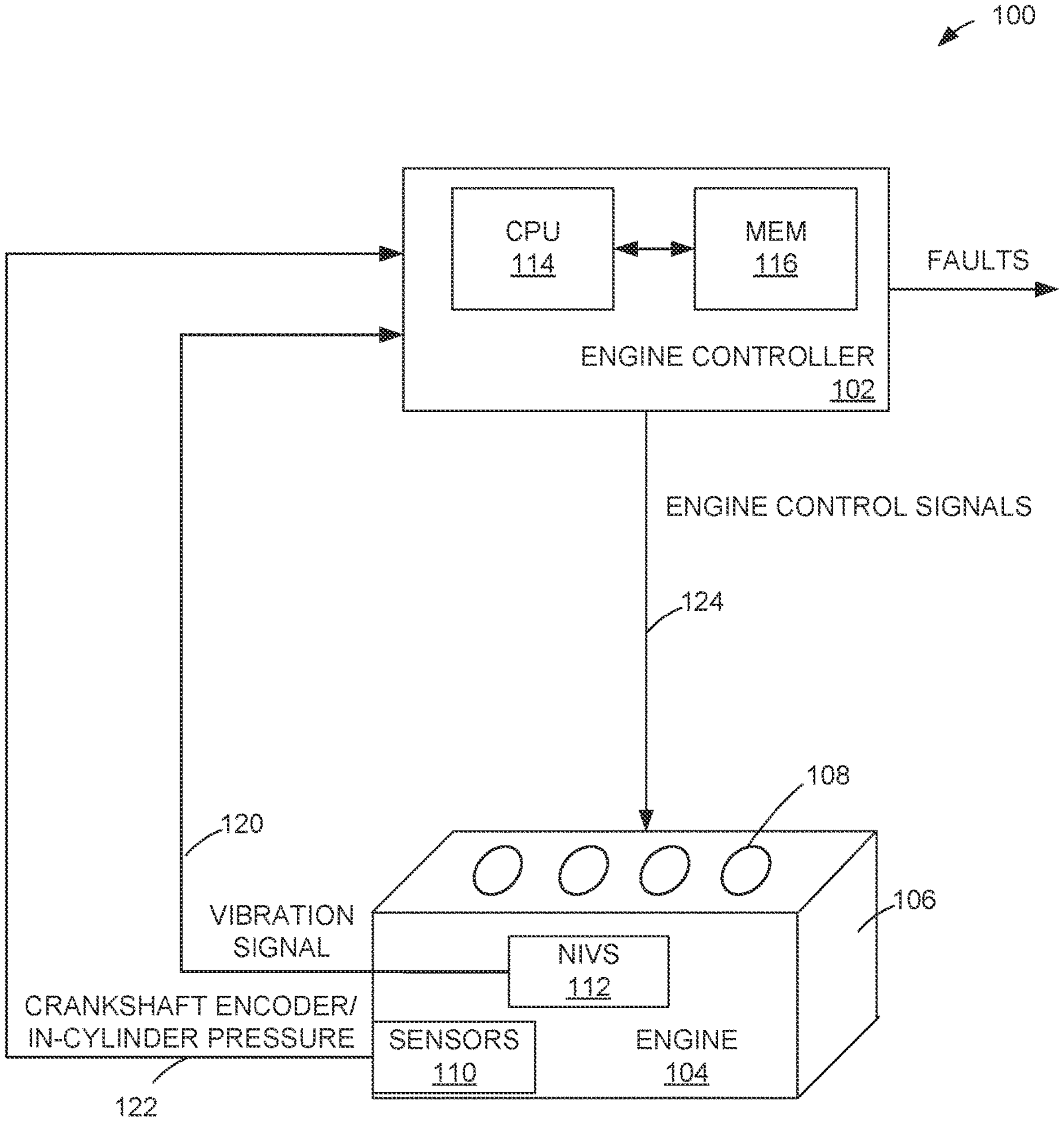
FIG. 5 is a block diagram illustrating an example approach to the example CI engine system of FIG. 1 in which measured in-cylinder pressure is compared to an estimated in-cylinder pressure, in accordance with one or more techniques of this disclosure.

As noted above, the in-cylinder pressure estimated from either of the two models described above may be used for diagnostic purposes. FIG. 5 is a block diagram illustrating an example approach to the example CI engine system of FIG. 1 in which measured in-cylinder pressure is compared to an estimated in-cylinder pressure, in accordance with one or more techniques of this disclosure.

In-cylinder pressure sensors are themselves relatively new components and can experience failure due to the harsh conditions and high temperature inside an engine cylinder. Additionally, fuel injectors on the engine are critical components for combustion. Even minor faults in the injectors can cause efficiency reduction and emission increase. Therefore, in order to achieve reliable engine operation, a health monitoring system capable of detecting and identifying faults in the in-cylinder pressure sensors and injectors in a multi-cylinder engine is valuable. Previous literature has not considered any faults in the vibration sensor itself which is the critical component to monitor the engine health in previously proposed methods. Since combustion pressure may be estimated in real-time using the differential equation models described above, the estimated in-cylinder pressure may then be utilized in a fault diagnostic system that can monitor the real-time health of a) The in-cylinder pressure sensors, when the engine is equipped with such sensors in each individual cylinder;
b) The fuel injectors in the individual cylinders; and
c) The non-intrusive accelerometer or acoustic emission sensor.

In the example approach of FIG. 5, the in-cylinder pressure sensors are interfaced with the CPU 114, in addition to the crankshaft encoder signal 122 and the non-intrusive sensor 112. The fault diagnostic system then monitors the health of the in-cylinder pressure sensors, of the non-intrusive vibration sensor 112 and of the fuel injectors in the cylinders 108.

In one example approach, a residue table is constructed by computing residues (or errors) between estimated and either measured or reference values for in-cylinder pressure. When a residue is computed between estimated and measured pressure, it may provide information related to failure of either pressure sensors or the accelerometer. When a residue is computed between the estimated or measured pressure and the expected (reference) pressure profile for the specified operating conditions, for example, additional diagnostic information about the failure of injectors becomes available. The following table shows how a unique pattern of residues is generated for each failure, i.e., a failure in either an injector, pressure sensor or accelerometer results in a unique pattern of residues from which one can pinpoint the specific device that has failed:

| Fault Sensor | Accelerometer | Pressure sensor 1 | Pressure sensor 2 | Injector 1 | Injector 2 |
|---|---|---|---|---|---|
| $P_1 - \hat{P}_1$ | H | H | L | H | L |
| $P_2 - \hat{P}_2$ | H | L | H | L | H |
| $P_1 - P_2(t - \tau)$ | L | H | H | H | H |
| $P_1 - P_{ref}$ | L | H | L | H | L |
| $P_2 - P_{ref}$ | L | L | H | L | H |
| $\hat{P}_1 - P_{ref}$ | H | L | L | H | L |
| $\hat{P}_2 - P_{ref}$ | H | L | L | L | H |

Thus, the non-intrusive sensor-based estimation system enables continuous monitoring of health of the pressure sensors and fuel injectors in this engine application. For example, consider two cylinders: cylinder i and cylinder j of a multi-cylinder diesel engine. In the absence of any failures, the in-cylinder pressure of cylinder j can be considered as a delayed version of the in-cylinder pressure of cylinder i (e.g., every two consecutive cylinders' pressure has a phase difference of 180 degrees in the case of 2 rotations per cycle for a four-stroke engine and the pressure profiles in each cylinder are nearly the same). Then, the following four residues between in-cylinder combustion pressure profiles of the 2 cylinders can be considered by using different combinations of estimated and measured combustion pressures:

1) R1=Difference between measured and estimated combustion pressures in cylinder i
2) R2=Difference between measured and estimated combustion pressures in cylinder j
3) R3=Time-delayed difference between measured combustion pressures in cylinder i and cylinder j
4) R4=Time-delayed difference between estimated combustion pressures in cylinder i and cylinder j A small delay error in estimating the combustion pressure can induce a large error in residue if when evaluating residues at each sampling time instead of a profile comparison over the whole cycle. Therefore, in order to achieve robust residue generation, the residues may be evaluated by considering both the error of pressure peak and the error of 1-norm of the pressure profile at each cycle. The measured combustion pressure peaks for cylinder i and j may be computed by taking the maximum value of the combustion pressure obtained from a pressure sensor, i.e., $\max(P_{c,i})$ and $\max(P_{c,j})$. Similarly, the estimated combustion pressure peaks for cylinder i and j may be obtained from $\max(\hat{P}_{c,i})$ and $\max(\hat{P}_{c,j})$ where $\hat{P}_{c,i}$ and $\hat{P}_{c,j}$ are the estimated combustion pressure for cylinder i and j using the developed model with vibration signal. Also, the 1-norms of pressure profile for each cylinder may be obtained as $\|P_{c,i}\|_1$ and $\|P_{c,j}\|_1$ using measured combustion pressures or $\|\hat{P}_{c,i}\|_1$ and $\|\hat{P}_{c,j}\|_1$ using estimated combustion pressures. Then, the residue in terms of pressure peaks can be evaluated as:

$$R1 = \left|\frac{\max(P_{c,i}) - \max(\hat{P}_{c,i})}{\max(P_{c,i})}\right|,$$

$$R2 = \left|\frac{\max(P_{c,j}) - \max(\hat{P}_{c,j})}{\max(P_{c,j})}\right|,$$

$$R3 = \left|\frac{\max(P_{c,i}) - \max(P_{c,j})}{\max(P_{c,i})}\right|,$$

$$R4 = \left|\frac{\max(\hat{P}_{c,i}) - \max(\hat{P}_{c,j})}{\max(\hat{P}_{c,i})}\right|$$

Additionally, the residue in terms of 1-norm of pressure profile can be evaluated as:

$$R1 = \left|\frac{\|P_{c,i}\|_1 - \|\hat{P}_{c,i}\|_1}{\|P_{c,i}\|_1}\right|,$$

-continued $$R2 = \left| \frac{\|P_{c,j}\|_1 - \|\hat{P}_{c,j}\|_1}{\|P_{c,j}\|_1} \right|,$$

$$R3 = \left| \frac{\|P_{c,i}\|_1 - \|\hat{P}_{c,j}\|_1}{\|P_{c,i}\|_1} \right|,$$

$$R4 = \left| \frac{\|\hat{P}_{c,i}\|_1 - \|\hat{P}_{c,j}\|_1}{\|\hat{P}_{c,i}\|_1} \right|,$$

Finally, each residue may be determined as high (H) if either of the two types of evaluation exceeds a certain set threshold. If both of the evaluations related to pressure peak and 1-norm of the pressure profile are less than the threshold, then the residue is defined as low (L).

Assume only one component fails at a given time. The above 4 residues may provide information related to failure of either an injector, in-cylinder pressure sensor or accelerometer based on the following facts:

i) An in-cylinder pressure sensor fault does not affect the estimation of the pressure in that cylinder using the vibration sensor.

ii) An injector fault leads the engine to be running in a different operating condition than it is intended. As a result, the difference between pressure measurements in cylinder 1 and 2 as well as the difference between estimation results of cylinder 1 and 2 will be large.

iii) An accelerometer fault does not affect the measurements from in-cylinder pressure sensors but affects the estimation of the pressure values.

Therefore, it is possible to detect and identify a fault in either an injector, in-cylinder pressure sensor or accelerometer using the 4 residues. By computing the 4 residues and determining which of the 4 patterns (if any) is generated, the source of the component failure can be identified.

Figure 6:
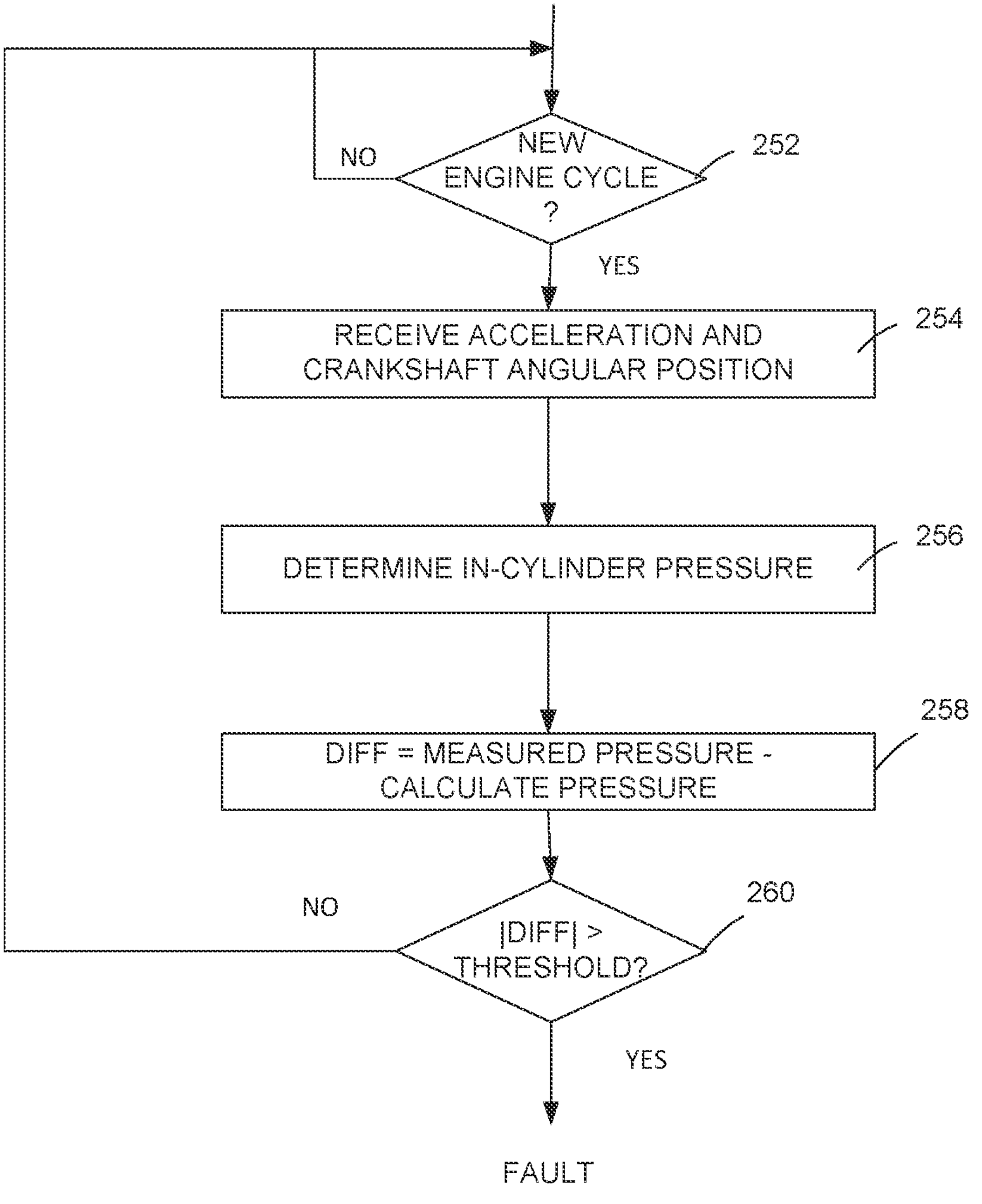
FIG. 6 illustrates a method of performing diagnostics in the engine systems of FIGS. 1 and 5, in accordance with one or more techniques of this disclosure.

FIG. 6 illustrates a method of performing diagnostics in the engine systems of FIGS. 1 and 5, in accordance with one or more techniques of this disclosure. In the example shown in FIG. 6, a new cycle is detected (252). CPU 114 in engine controller 102 receives an acceleration signal 120 and a signal relating crankshaft angular position (e.g., crankshaft encoder signal 122 of FIG. 2) from engine 104 (254) and determines in-cylinder pressure (256). CPU 114 then compares measured in-cylinder pressure to estimated in-cylinder pressure (258) and generates a fault is the difference is above a threshold value. engine control signals based on the estimated in-cylinder pressure (260).

Experiments of in-cylinder pressure estimation results over varying cylinder rpm and fuel injection conditions show estimation of combustion pressure using signals from the non-intrusive accelerometer sensors is effective. Comparisons of the estimated combustion pressure with actual measured pressure at different engine speeds, injection timings, injection durations and for single and multiple fuel injections are documented. The experiments also show estimation of SoC, CA50 and CA90 values from the estimated values of combustion pressure and real-time cylinder volume is effective. Comparisons were made of these variables estimated from the non-intrusive sensor with the values when obtained from the actual measured combustion pressure, so as to evaluate the accuracy of the estimation method. The experiments also show effectiveness of the fault diagnostic system in detecting and identifying various types of faults in the pressure sensors, fuel injectors and the non-intrusive accelerometer sensor.

Thus, the non-intrusive sensor-based estimation system enables continuous monitoring of health of the pressure sensors and fuel injectors in this engine application.

A list of example applications of the techniques describes above follows:

Example 1) An in-cylinder pressure estimation system which makes use of a differential equation model specifically relating combustion component of measured acceleration signal to combustion component of in-cylinder pressure.

Example 2) The in-cylinder pressure estimation system of example 1 in which the model is based on the proportionality of energy released in combustion to the energy of vibration at the non-intrusive sensor location.

Example 3) The in-cylinder pressure estimation system of example 1 in which the combustion component of acceleration signal is obtained by subtracting non-combustion acceleration component from total acceleration.

Example 4) The in-cylinder pressure estimation system of examples 1 and 3 in which the non-combustion component of acceleration signal is computed using a feedforward adaptive LMS algorithm that uses crankshaft encoder signals as a reference input to extract the crankshaft-position-correlated component from the total acceleration.

Example 5) The in-cylinder pressure estimation system of example 1 in which, after combustion component of in-cylinder pressure has been obtained, the total in-cylinder pressure is further obtained by adding combustion pressure component to motored pressure component.

Example 6) The in-cylinder pressure estimation system of example 1 in which the said differential equation has parameters which vary with injection pressure, injection duration, and number of injections.

Example 7) The in-cylinder pressure estimation system of example 1 in which the non-intrusive accelerometer sensor is replaced by a non-intrusive acoustic emission sensor.

Example 8) A non-intrusive estimation system for in-cylinder combustion variables that utilizes the non-intrusive sensor's signal to estimate the start of combustion (SoC), i.e., the crank angle at which combustion started.

Example 9) A non-intrusive estimation system for in-cylinder combustion variables that utilizes the non-intrusive sensor's signal to estimate the crank angle for 50% heat release (CA50), i.e., the crank angle at which 50% of the heat release was completed.

Example 10) A non-intrusive estimation system for in-cylinder combustion variables that utilizes the non-intrusive sensor's signal to estimate the crank angle for 90% heat release (CA90), i.e., the crank angle at which 90% of the heat release was completed.

Example 11) A non-intrusive estimation system to estimate the start of combustion (SoC) by using the intermediate variable of the in-cylinder pressure estimated from the differential equation model relating combustion pressure to combustion component of acceleration signal.

Example 12) A non-intrusive estimation system to estimate the crank angle for 50% heat release (CA50) by using the intermediate variable of the in-cylinder pressure estimated from the differential equation model relating combustion pressure to combustion component of acceleration signal.

Example 13) A non-intrusive estimation system to estimate the crank angle for 90% heat release (CA90) by using the intermediate variable of the in-cylinder pressure estimated from the differential equation model relating combustion pressure to combustion component of acceleration signal.

Example 14) A health monitoring system in which a non-intrusive sensor on the engine block is used together with in-cylinder pressure sensors to continuously monitor the health and to diagnose faults in: i) any of the in-cylinder pressure sensors, ii) any of the in-cylinder fuel injectors, and iii) the non-intrusive vibration/acoustic sensor.

Example 15) The health monitoring system of example 14 in which non-intrusive estimates of in-cylinder pressure obtained from the vibration/acoustic transducer are used to diagnose faults in the in-cylinder pressure sensors, Example 16) The health monitoring system of example 14 in which differences between expected levels of in-cylinder pressure and both measured and estimated levels of in-cylinder pressure are used to diagnose faults in the in-cylinder fuel injectors.

Example 17) The health monitoring system of example 14 in which non-intrusive estimates of in-cylinder pressure in multiple cylinders in the engine block are used to diagnose faults in the non-intrusive sensor.

Example 18) The health monitoring system of example 14 in which residues are computed between a number of in-cylinder pressure signals and their estimates and reference values, and analysis of the pattern of growth in residues is utilized to diagnose fault in any of the pressure sensors, fuel injectors or the non-intrusive sensor.

Example 19) A method of estimating in-cylinder pressure, including: receiving a vibration signal from a vibration sensor mounted proximate a compression ignition (CI) engine; receiving angular position information for the CI engine; and determining in-cylinder pressure based on the angular position information and on a combustion component of the vibration signal.

Example 20) The method of example 19, wherein determining in-cylinder pressure based on the angular position information and on a combustion component of the vibration signal includes applying a differential model of in-cylinder pressure as a function of the angular position information and of the combustion component of the vibration signal.

Example 21) The method of example 20, wherein the differential model is based on a root mean squared (RMS) model of the combustion component of the vibration signal.

Example 22) The method of any of examples 19-21, wherein the vibration signal includes the combustion component of the vibration signal and a non-combustion component of the vibration signal, the method further including determining the combustion component of the vibration signal by subtracting the non-combustion component of the vibration signal from the vibration signal.

Example 23) The method of example 22, further including computing the non-combustion component of the vibration signal using a feedforward adaptive LMS algorithm that uses crankshaft encoder signals as a reference input to extract crankshaft-position-correlated components from the vibration signal.

Example 24) The method of any of examples 19-23, wherein determining in-cylinder pressure based on the angular position information and on a combustion component of the vibration signal includes adding a combustion component of in-cylinder pressure to an estimated motored pressure component of the in-cylinder pressure.

Example 25) The method of any of examples 20-24, wherein the differential model has parameters which vary with injection pressure, injection duration, and number of injections.

Example 26) The method of any of example 19-25, wherein the vibration sensor is an accelerometer sensor.

Example 27) The method of any of example 19-25, wherein the vibration sensor is an acoustic emission sensor.

Example 28) A device including: memory; and at least one processor configured to perform the method of any of examples 19-27.

Example 29) A device, including: at least one processor; and a computer-readable storage medium including instructions that are executable by at least one processor to perform the method of any of examples 19-27.

Example 30) A non-transitory, computer-readable medium including executable instructions, which when executed by processing circuitry, cause a computing device to perform the method of any of examples 19-27.

Example 31) An engine system, including: an engine controller; a CI engine connected to the engine controller, the CI engine configured to receive engine control signals from the engine controller and to transmit current engine operating condition measurements to the engine controller, the CI engine having an engine block, the current engine operating condition measurements including angular position information; and a vibration sensor placed proximate to the engine block, wherein the engine controller includes at least one processor configured to: receive a vibration signal from the vibration sensor; determine an in-cylinder pressure based on the angular position information for a current cycle of the CI engine and on a combustion component of the vibration signal; and generate revised engine control signals for a next cycle of the CI engine based on the in-cylinder pressure.

Example 32) The system of example 31, wherein the vibration sensor is one of an accelerometer sensor or an acoustic emission sensor.

Example 33) A method of diagnosing faults, including: receiving a vibration signal from a vibration sensor mounted proximate a compression ignition (CI) engine; receiving in-cylinder pressure information and angular position information for the CI engine; determining estimated in-cylinder pressure based on the angular position information and on a combustion component of the vibration signal; determining if a difference between the received in-cylinder pressure information and the estimated in-cylinder pressure is greater than a threshold value; and responsive to determining that the difference between the received in-cylinder pressure information and the estimated in-cylinder pressure is greater than the threshold value, generating a failure indication.

Example 34) The method of example 33, wherein generating a failure indication includes identifying a fault in an in-cylinder fuel injector based on differences between an expected in-cylinder pressure, the received in-cylinder pressure and the estimated in-cylinder pressure.

Example 35) The method of examples 33-34, wherein generating a failure indication includes identifying a fault in the vibration sensor based on differences between an expected in-cylinder pressure, the received in-cylinder pressure and the estimated in-cylinder pressure.

Example 36) The method of examples 33-35, wherein generating a failure indication includes applying a pattern of residues to diagnose fault in any one or more of the vibration sensor, an engine pressure sensor, and an engine fuel injector.

Example 37) A device, including: at least one processor; and a computer-readable storage medium including instructions that are executable by at least one processor to perform the method of any of examples 33-36.

Example 38) A non-transitory, computer-readable medium including executable instructions, which when executed by processing circuitry, cause a computing device to perform the method of any of examples 33-36.

Example 39) A device including: memory; and at least one processor configured to perform the method of any of examples 33-36.

Example 40) An engine system, including: an engine controller; a CI engine connected to the engine controller, the CI engine configured to receive engine control signals from the engine controller and to transmit current engine operating condition measurements to the engine controller, the CI engine having an engine block, the current engine operating condition measurements including angular position information and measured in-cylinder pressure for one or more cylinders of the CI engine; and a vibration sensor placed proximate to the engine block, wherein the engine controller includes at least one processor configured to: receive a vibration signal from the vibration sensor; receive the measured in cylinder pressure for at least one cylinder of the CI engine; receive angular position information for the CI engine; determine an estimated in-cylinder pressure for the at least one cylinder of the CI engine based on the angular position information for the at least one cylinder for a current cycle of the CI engine and on a combustion component of the vibration signal; determine if a difference between the measured in-cylinder pressure and the estimated in-cylinder pressure is greater than a threshold; and responsive to determining that the difference between the measured in-cylinder pressure and the estimated in-cylinder pressure is greater than the threshold, generate a failure indication Example 41) The system of example 40, wherein to generate the failure indication, the at least one processor is configured to identify a fault in an in-cylinder fuel injector based on differences between an expected in-cylinder pressure, the measured in-cylinder pressure and the estimated in-cylinder pressure.

Example 42) The system of example 40, wherein to generate the failure indication, the at least one processor is configured to identify a fault in the vibration sensor based on differences between an expected in-cylinder pressure, the measured in-cylinder pressure and the estimated in-cylinder pressure.

Example 43) The system of example 40, wherein to generate the failure indication, the at least one processor is configured to apply a pattern of residues to diagnose fault in any one or more of the vibration sensor, an engine pressure sensor, and an engine fuel injector.

Example 44) The system of example 31, wherein the CI engine comprises one or more cylinders, wherein the at least one processor is further configured to determine one or more of a start of combustion (SOC) value, a CA50 value, and a CA90 value based on the determined in-cylinder pressure and a volume of the one or more cylinders, and wherein to determine one or more of the CA50 value, the SOC value, and the CA90 value, the at least one processor is configured to determine the crank angle at which a threshold amount of heat release has occurred based on a normalized integration of a heat release rate equation.

Example 45) An engine system, including: an engine controller; a CI engine connected to the engine controller, the CI engine configured to receive engine control signals from the engine controller and to transmit current engine operating condition measurements to the engine controller, the CI engine having an engine block, the current engine operating condition measurements including angular position information; and a vibration sensor placed proximate to the engine block, and configured to generate a vibration signal corresponding to vibration of the engine block in operation, wherein the engine controller comprises at least one processor configured to: receive the vibration signal from the vibration sensor; determine a combustion component of the vibration signal; determine one or more of a start of combustion (SOC) value, a CA50 value, and a CA90 value based on the combustion component of the vibration signal; and generate revised engine control signals for a next cycle of the CI engine based on one or more of the SOC value, the CA50 value, and the CA90 value.

As noted above, previous attempts to estimate in-cylinder pressure have failed separate the combustion component of the vibration signal and relating it to the combustion component of in-cylinder pressure. The pressure inside the cylinder is the sum of motored pressure (pressure due to purely motion of the piston inside the cylinder) and combustion pressure. Likewise, the vibration signal is the sum of vibrations caused by motion of the pistons inside the cylinders and the vibrations caused by acoustic energy due to combustion that propagates through the engine block to the accelerometer location. It is, therefore, necessary to separate combustion components of both the vibration signal and the pressure, since they have a very different relationship to each other, compared to the non-combustion components. Furthermore, the non-intrusive vibration sensor may be used to perform fault diagnostics and identify real-time failures in the fuel injectors and in-cylinder pressure sensors.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a cassette, magnetic media, optical media, or other computer readable media.

What is claimed is:

1. An engine system, comprising:

an engine controller;

a compression ignition (CI) engine connected to the engine controller, the CI engine configured to receive engine control signals from the engine controller and to transmit current engine operating condition measurements to the engine controller, the CI engine having an engine block, the current engine operating condition measurements including angular position information; and a vibration sensor placed proximate to the engine block, wherein the engine controller comprises at least one processor configured to:

receive a vibration signal from the vibration sensor;

determine a non-combustion component of the vibration signal indicative of vibrations in the engine block not caused by combustion;

determine a combustion component of the vibration signal based on the non-combustion component of the vibration signal and the vibration signal, wherein the combustion component of the vibration signal is indicative of vibrations in the engine block caused by combustion;

determine an in-cylinder pressure based on the angular position information for a current cycle of the CI engine and on the combustion component of the vibration signal; and generate revised engine control signals for a next cycle of the CI engine based on the determined in-cylinder pressure.

2. The system of claim 1, wherein the vibration sensor is one of an accelerometer sensor or an acoustic emission sensor.

3. The system of claim 1, wherein the at least one processor is further configured to:

determine the non-combustion component of the vibration signal using a feedforward adaptive LMS algorithm that uses crankshaft encoder signals as a reference input to extract crankshaft-position-correlated components from the vibration signal; and determine the combustion component of the vibration signal by subtracting the non-combustion component of the vibration signal from the vibration signal.

4. The system of claim 1, wherein to determine the in-cylinder pressure, the at least one processor is further configured to apply a differential model of in-cylinder pressure as a function of the angular position information and of the combustion component of the vibration signal, wherein the differential model is based on a root mean squared (RMS) model of the combustion component of the vibration signal.

5. The system of claim 1, wherein the CI engine comprises one or more cylinders, wherein the at least one processor is further configured to determine one or more of a start of combustion (SOC) value, a CA50 value, and a CA90 value based on the determined in-cylinder pressure and a volume of the one or more cylinders, and wherein to determine one or more of the CA50 value, the SOC value, and the CA90 value, the at least one processor is configured to determine the crank angle at which a threshold amount of heat release has occurred based on a normalized integration of a heat release rate equation.

* * * * *